United States Patent
Zhang et al.

(10) Patent No.: US 12,216,500 B2
(45) Date of Patent: Feb. 4, 2025

(54) FOLDABLE MECHANISM AND MOBILE TERMINAL

(71) Applicant: HONOR DEVICE CO., LTD., Shenzhen (CN)

(72) Inventors: Yaolei Zhang, Shenzhen (CN); Zhengping Tan, Shenzhen (CN); Yilin Lu, Shenzhen (CN); Bin Yan, Shenzhen (CN); Yuan Wang, Shenzhen (CN); Haifei Li, Shenzhen (CN); Guotong Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/790,717

(22) PCT Filed: Jan. 29, 2022

(86) PCT No.: PCT/CN2022/075036
§ 371 (c)(1),
(2) Date: Jul. 1, 2022

(87) PCT Pub. No.: WO2022/193864
PCT Pub. Date: Sep. 22, 2022

(65) Prior Publication Data
US 2024/0201740 A1 Jun. 20, 2024

(30) Foreign Application Priority Data
Mar. 17, 2021 (CN) .......................... 202110286914.9

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1681* (2013.01);
(Continued)

(58) Field of Classification Search
CPC .. G06F 1/1652; G06F 1/1681; H04M 1/0206; H04M 1/022
See application file for complete search history.

(56) References Cited

U.S. PATENT DOCUMENTS 9,348,450 B1 * 5/2016 Kim .................... H04M 1/0268
11,194,366 B2 12/2021 Cheng
(Continued)

FOREIGN PATENT DOCUMENTS

CN 108173995 A 6/2018
CN 207977988 U 10/2018
(Continued)

*Primary Examiner* — James Wu
*Assistant Examiner* — Dakota M Talbert
(74) *Attorney, Agent, or Firm* — WOMBLE BOND DICKINSON (US) LLP

(57) ABSTRACT

A foldable mechanism comprises a base assembly, two support assemblies, and two driving assemblies. The base assembly includes a bottom seat and two hinge seats respectively fixed to two sides of the bottom seat. The support assembly includes an outer plate member and an inner plate member located between the two outer plate members, the outer plate member and the inner plate member are pivotally connected to the corresponding hinge seat respectively, and pivotal axes of the outer plate members and the inner plate members are parallel to a central axis L of the bottom seat; the driving assembly is connected to and between the bottom seat and the inner plate member corresponding to the driving assembly; and when the foldable mechanism is in a folded state, the driving assemblies respectively drive the corresponding inner plate members to flip toward the bottom seat. Related mobile terminal is also described.

20 Claims, 9 Drawing Sheets

(52) U.S. Cl.
CPC ......... *H04M 1/0206* (2013.01); *H04M 1/022* (2013.01); *H04M 1/0268* (2013.01)

(56) References Cited

U.S. PATENT DOCUMENTS

| | | |
|---|---|---|
| 11,223,710 B2 | 1/2022 | Cheng |
| 2019/0339742 A1 | 11/2019 | Jia |
| 2020/0259937 A1 | 8/2020 | Harmon |
| 2021/0044682 A1 | 2/2021 | Liu et al. |
| 2021/0067614 A1* | 3/2021 | Cheng .................. G06F 1/1681 |
| 2021/0267076 A1* | 8/2021 | Zhang ................. E05D 11/1014 |
| 2021/0357000 A1 | 11/2021 | Deng |

FOREIGN PATENT DOCUMENTS

| | | |
|---|---|---|
| CN | 208190691 U | 12/2018 |
| CN | 109780403 A | 5/2019 |
| CN | 110714979 A | 1/2020 |
| CN | 212624631 U | 2/2021 |
| CN | 113890911 A | 1/2022 |
| WO | 2019134693 A1 | 7/2019 |

\* cited by examiner

FOLDABLE MECHANISM AND MOBILE TERMINAL

CROSS-REFERENCE TO RELATED APPLICATIONS

This application is a National Stage of International Application No. PCT/CN2022/075036, filed Jan. 29, 2022, which claims priority to Chinese Patent Application No. 202110286914.9, filed Mar. 17, 2021, both of which are hereby incorporated by reference in their entireties.

TECHNICAL FIELD

This application relates to the field of mobile terminals, and in particular, to a foldable mechanism and a mobile terminal.

BACKGROUND

The foldable mobile phone is a novel mobile terminal, and differs from the ordinary mobile phone in that a screen of the foldable mobile phone can be unfolded and folded.

In the related art, the inner folding solution is a folding solution that is often adopted for the foldable mobile phone. The foldable mobile phone adopting the inner folding solution includes a foldable mechanism. The foldable mechanism mainly includes a shaft seat, a middle door plate, and two outer door plates. The two outer door plates are respectively located at two sides of a central axis of the shaft seat and are pivotally connected to the shaft seat respectively, and the middle door plate is located between the two outer door plates and has one plate surface connected to the shaft seat. When the foldable mobile phone is in an unfolded state, the middle door plate and the two outer door plates are located in the same plane, to support a screen. When the foldable mobile phone needs to be transformed to a folded state, the two outer door plates rotate around their own pivotal axes, and are gradually folded together at a side of the middle door plate facing away from the shaft seat. In this process, the screen is bent accordingly, while the middle door plate remains stationary and abuts against a bending part of the screen.

However, the foregoing foldable mechanism is not conducive to the miniaturized design of the foldable mobile phone.

SUMMARY

Embodiments of this application provide a foldable mechanism and a mobile terminal, to resolve a problem of how to miniaturize the design. The technical solutions are as follows.

According to a first aspect, a foldable mechanism is provided. The foldable mechanism includes a base assembly, two support assemblies that are symmetric to each other, and two driving assemblies that are symmetric to each other. The base assembly includes a bottom seat and two hinge seats, the bottom seat is configured to bear the two hinge seats, and the two hinge seats are respectively fixed to two sides of the bottom seat. By arranging the two hinge seats in this manner, a space of the bottom seat can be fully used, which is conducive to the arrangement of the two support assemblies and the two driving assemblies. The two support assemblies are respectively located at two sides of a central axis of the bottom seat, that is, each correspond to one hinge seat. The support assembly includes an outer plate member and an inner plate member, and the two inner plate members are located between the two outer plate members, that is, the two inner plate members are located at a middle position, and the two outer plate members are respectively located at two sides. For one of the support assemblies, the outer plate member and the inner plate member are pivotally connected to the corresponding hinge seat respectively, and pivotal axes of the outer plate member and the inner plate member are parallel to the central axis of the bottom seat. The driving assembly is connected to and between the bottom seat and the inner plate member corresponding to the driving assembly. In this design, the driving assembly can drive the corresponding inner plate member to move relative to the bottom seat. When the foldable mechanism is in a folded state, the driving assemblies respectively drive the corresponding inner plate members to flip toward the bottom seat, to form a concave space for accommodating a bending part of a flexible screen at an angle between the two inner plate members. That is, when the foldable mechanism is folded, the concave space can be formed at the angle between the two inner plate members, and the flexible screen can have its own bending part accommodated in the concave space, so that an external volume of the flexible screen is reduced, which is conducive to the miniaturized design.

The foldable mechanism provided in this embodiment of this application has at least the following beneficial effects:

When the flexible screen is borne by the foldable mechanism provided in this embodiment of this application, if the flexible screen needs to be folded by folding the foldable mechanism, the two inner plate members flip toward the bottom seat around their own pivotal axes under the action of the driving assemblies, to form an angle between the two inner plate members and form the concave space at the angle. The concave space can provide a space basis for accommodating the bending part of the flexible screen. At the same time, the two outer plate members flip facing away from the bottom seat around their own pivotal axes, until the two outer plate members are folded together at sides of the inner plate members facing away from the bottom seat. In the process of folding the outer plate members together, the flexible screen is gradually folded, and partially forms the bending part. Because the concave space provides the space basis for accommodating the bending part of the flexible screen, the bending part of the flexible screen can be accommodated in the concave space. In this way, the size of the flexible screen located outside the concave space is reduced, which is conducive to the miniaturized design.

In an exemplary embodiment, the driving assembly includes an elastic member, one portion of the elastic member is connected to the bottom seat, and another portion of the elastic member is connected to a part of the inner plate member close to the central axis of the bottom seat. In this design, by using the elasticity of the elastic member, the part of the inner plate member close to the central axis of the bottom seat can be pulled to move toward the bottom seat, to form the concave space at the angle between the two inner plate members.

In an exemplary embodiment, the driving assembly includes a first magnet and a second magnet. The first magnet and the second magnet are opposite to each other, and are close to the central axis of the bottom seat. The first magnet is connected to the bottom seat. The second magnet is connected to the inner plate member. Portions of the first magnet and the second magnet that are opposite to each other have different magnetic poles. By using a magnetic attraction force between the first magnet and the second magnet, the part of the inner plate member close to the central axis of the bottom seat can be pulled to move toward the bottom seat, to form the concave space at the angle between the two inner plate members.

In an exemplary embodiment, the base assembly further includes two stop ribs, and one of the stop ribs corresponds to one of the inner plate members. The stop rib is located between the bottom seat and the corresponding inner plate member, a first end of the stop rib is connected to the bottom seat, and a second end of the stop rib is configured to come into contact with the part of the inner plate member close to the central axis of the bottom seat. In this design, a maximum angle by which the inner plate member flips can be limited by using the stop rib, thereby limiting the volume of the concave space, so that the volume of the concave space can match the flexible screen, thereby better achieving the miniaturized design.

In an exemplary embodiment, the inner plate member includes an inner support plate and a hinge lug. There is a spacing between the inner support plate and the bottom seat, and is configured to provide a space for the inner support plate to flip, to prevent the concave space formed after the flipping from being insufficient to accommodate the bending part of the flexible screen. The hinge lug is located at a side edge of the inner support plate close to the outer plate member and is connected to the inner support plate, and the hinge lug is pivotally connected to the hinge seat. In this design, the inner plate member can be pivotally connected to the hinge seat by the hinge lug, the flexible screen can be supported by the inner support plate, and the concave space can be formed after the flipping.

In an exemplary embodiment, the inner plate member further includes a tray, the tray is connected to a side edge of the inner support plate close to the central axis of the bottom seat. Two trays are opposite to each other and form an accommodation space. In this design, not only the middle plate member is lifted by the trays, but also the middle plate member is accommodated by the accommodation space, which is conducive to the miniaturized design. The foldable mechanism further includes a middle plate member and a middle elastic member. The middle plate member is located in the accommodation space, one plate surface of the middle plate member is in contact with the two trays, and an other, opposite plate surface of the middle plate member is configured to come into contact with the bending part of the flexible screen. The middle elastic member is located between the two driving assemblies, and between the middle plate member and the bottom seat. One portion of the middle plate member is connected to the middle elastic member, and another portion of the middle elastic member is connected to the bottom seat. When the foldable mechanism is in a folded state, the middle elastic member drives the middle plate member to move toward the bottom seat, so that the middle plate member is located in the concave space and is configured to come into contact with the bending part of the flexible screen. That is, under the action of the middle elastic member, the middle plate member can be pulled to move toward the bottom seat, so that the middle plate member is located in the concave space and can come into contact with the bending part of the flexible screen. In this way, a contact area between the foldable mechanism and the bending part of the flexible screen is increased, so that the bending part of the flexible screen is supported more stably.

In an exemplary embodiment, the outer plate member includes an outer support plate and a support arm. The support arm is located between the outer support plate and the bottom seat and between the inner plate member and the bottom seat, that is, one portion of the support arm is located between the outer support plate and the bottom seat, and another portion of the support arm is located between the inner plate member and the bottom seat. The support arm is divided into a first end, a second end, and a middle portion located between the first end and the second end in a length direction. The middle portion of the support arm is pivotally connected to the hinge seat, the first end of the support arm is connected to the outer support plate, and the second end of the support arm is in contact with a plate surface of the inner plate member facing toward the bottom seat. The outer plate member is pivotally connected to the hinge seat by the middle portion of the support portion, the support arm is connected to the outer support plate by the first end of the support arm, and the inner plate member is lifted by the support arm through the second end of the support arm, so that the flexible screen is stably supported.

In an exemplary embodiment, the outer support plate includes an outer support plate body and a socket. The socket is connected to a plate surface of the outer support plate body facing toward the bottom seat, and the support arm is inserted into the socket. In this design, the socket provides an insertion basis for the support arm, so that the support arm can be inserted on the plate surface of the outer support plate body facing toward the bottom seat. In this way, the support arm can be prevented from affecting the support of the flexible screen by the outer support plate, so that the flexible screen can be stably supported.

In an exemplary embodiment, the support arm includes a first arm body, a hinge cylinder, and a second arm body that are sequentially connected. The first arm body is inserted into the socket, so that the support arm is connected to the outer support plate. The second arm body is located between the inner plate member and the bottom seat, and the second arm body is in contact with a plate surface of the inner plate member close to the bottom seat, so that the inner plate member is lifted. The hinge cylinder is located between the outer support plate body and the inner plate member, and the hinge cylinder is pivotally connected to the hinge seat, so that the support arm is pivotally connected to the hinge seat.

In an exemplary embodiment, a part of the second arm body in contact with the inner plate member is a trapezoid surface, an upper bottom edge of the trapezoid surface is connected to the hinge cylinder, and the trapezoid surface is attached to the inner plate member. In this design, a contact area between the second arm body and the inner plate member can be ensured, so that the inner plate member is supported more stably.

In an exemplary embodiment, for the same support assembly, the pivotal axis of the outer plate member and the pivotal axis of the inner plate member are coaxial. In this way, the outer plate member and the inner plate member can be arranged more compactly, which is more conducive to the miniaturized design.

According to a second aspect, a mobile terminal is provided, including a foldable mechanism and a flexible screen. The foldable mechanism is the foldable mechanism provided in the first aspect, and the flexible screen is respectively attached to the two inner plate members and the two outer plate members.

The mobile terminal provided in this embodiment of this application has at least the following beneficial effects:

When the mobile terminal provided in this embodiment of this application needs to be folded, the flexible screen is folded by folding the foldable mechanism, and the two inner plate members flip toward the bottom seat around their own pivotal axes under the action of the driving assemblies, to form an angle between the two inner plate members and form the concave space at the angle. The concave space can provide a space basis for accommodating the bending part of the flexible screen. At the same time, the two outer plate members flip facing away from the bottom seat around their own pivotal axes, until the two outer plate members are folded together at sides of the inner plate members facing away from the bottom seat. In the process of folding the outer plate members together, the flexible screen is gradually folded, and partially forms the bending part. Because the concave space provides the space basis for accommodating the bending part of the flexible screen, the bending part of the flexible screen can be accommodated in the concave space. In this way, the size of the flexible screen located outside the concave space is reduced, which is conducive to the miniaturized design.

ILLUSTRATION OF THE DRAWINGS

1: base assembly; 11: bottom seat; 12: hinge seat; 13: stop rib;

2: support assembly; 21: outer plate member; 211: outer support plate; 2111: outer support plate body; 2112: socket; 212: support arm; 2121: first arm body; 2122: hinge cylinder; 2123: second arm body; 2123a: trapezoid surface; 22: inner plate member; 221: inner support plate; 222: hinge lug; 223: tray; A: concave space; B: accommodation space;

3: driving assembly; 31: elastic member; 32: first magnet; 33: second magnet;

4: middle plate member;

5: middle elastic member;

100: foldable mechanism; 200: flexible screen; 210: bending part;

310: shaft seat; 320: middle door plate; 330: outer door plate; 400: screen.

DESCRIPTION OF EMBODIMENTS

Terms used in DESCRIPTION OF EMBODIMENTS of this application are merely intended to explain embodiments of this application rather than limit this application.

The foldable mobile phone is a novel mobile terminal, and differs from the ordinary mobile phone in that a screen of the foldable mobile phone can be unfolded and folded.

Figure 1:
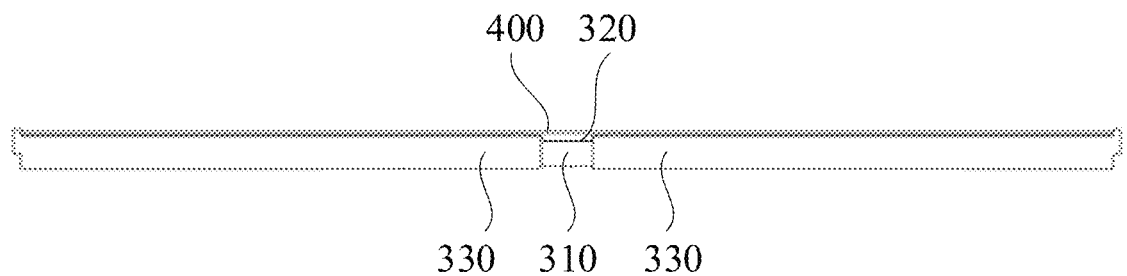
FIG. 1 is a schematic structural diagram of a foldable mechanism in the related art in an unfolded state.
Figure 2:
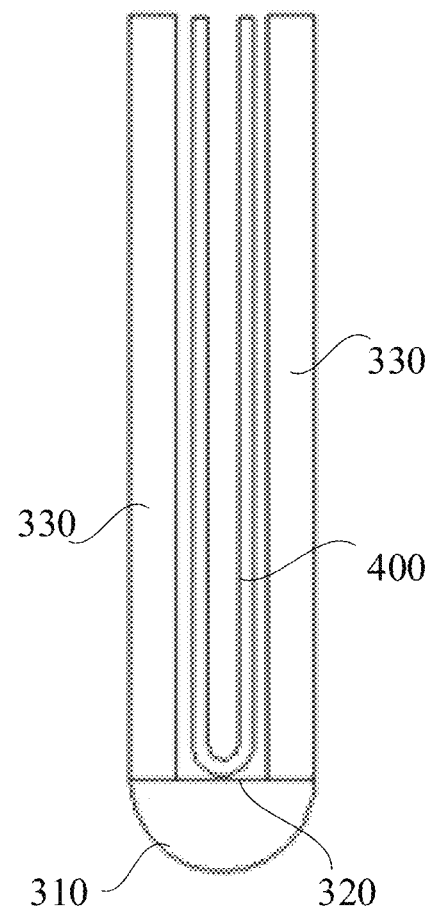
FIG. 2 is a schematic structural diagram of a foldable mechanism in the related art in a folded state.

In the related art, the inner folding solution is a folding solution that is often adopted for the foldable mobile phone. The foldable mobile phone adopting the inner folding solution includes a foldable mechanism. FIG. 1 is a schematic structural diagram of a foldable mechanism in the related art in an unfolded state. The foldable mechanism mainly includes a shaft seat 310, a middle door plate 320, and two outer door plates 330. The two outer door plates 330 are respectively located at two sides of a central axis of the shaft seat 310 and are pivotally connected to the shaft seat 310 respectively, and the middle door plate 320 is located between the two outer door plates 330, and has a plate surface that is close to the shaft seat 310 and that is connected to the shaft seat 310. When the foldable mobile phone is in an unfolded state, the middle door plate 320 and the two outer door plates 330 are located in the same plane, to support a screen 400. FIG. 2 is a schematic structural diagram of a foldable mechanism in the related art in a folded state. When the foldable mobile phone needs to be transformed to a folded state, the two outer door plates 330 rotate around their own pivotal axes, and are gradually folded together at a side of the middle door plate 320 facing away from the shaft seat 310. In this process, the screen 400 is bent accordingly, while the middle door plate 320 remains stationary and abuts against a bending part of the screen 400.

Figure 3:
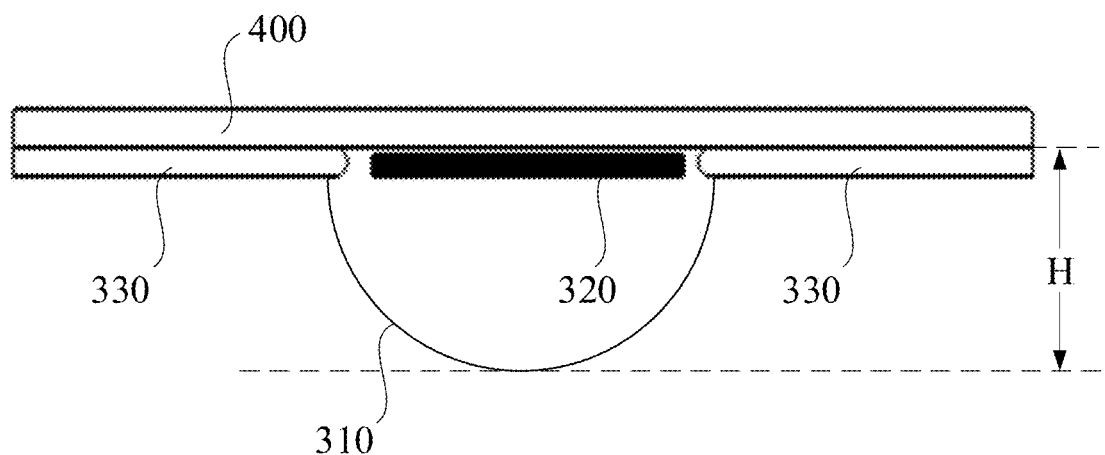
FIG. 3 is a simplified schematic diagram of a foldable mechanism in the related art in an unfolded state.
Figure 4:
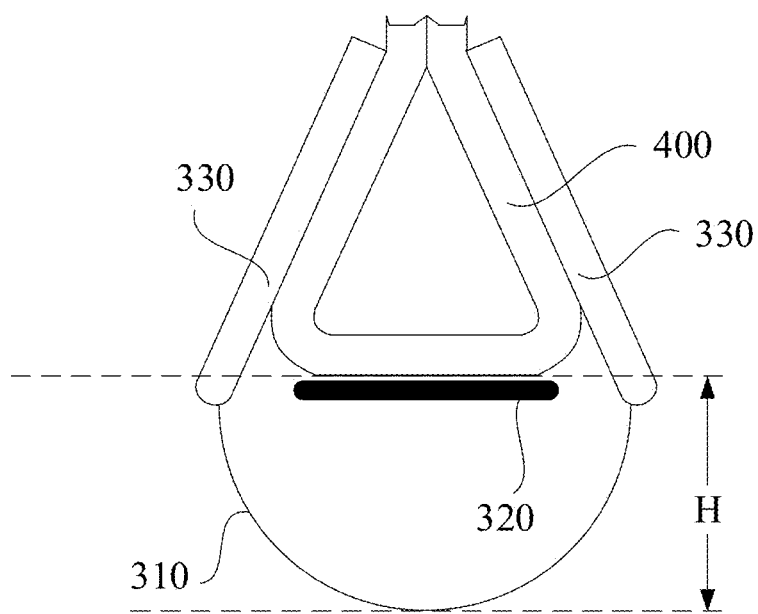
FIG. 4 is a simplified schematic diagram of a foldable mechanism in the related art in a folded state.

FIG. 3 is a simplified schematic diagram of a foldable mechanism in the related art in an unfolded state. FIG. 4 is a simplified schematic diagram of a foldable mechanism in the related art in a folded state. It can be learned from FIG. 3 and FIG. 4 that, when the foldable mechanism is in both the states, a distance between the middle door plate 320 and a housing of the shaft seat 310 remains unchanged. Because the screen 400 abuts against the middle door plate 320, a distance H between the screen 400) and the housing of the shaft seat 310 also remains unchanged.

That is, in the related art, a main reason why the size of the foldable mobile phone after being folded does not decrease is that the size of the foldable mechanism does not decrease after the foldable mechanism is transformed from the unfolded state to the folded state. Therefore, to resolve this problem, this application provides an improved solution.

Figure 5:
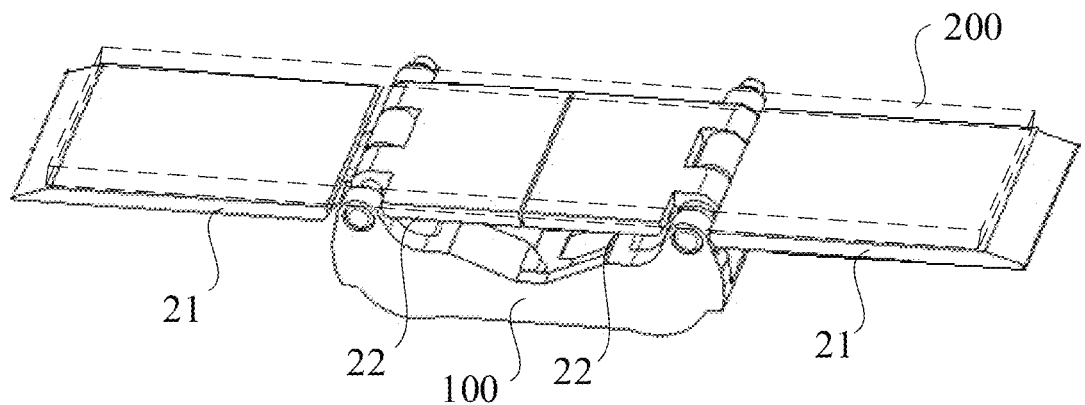
FIG. 5 is a schematic partial structural diagram of a mobile terminal according to an embodiment of this application.

The embodiments of this application further provide a mobile terminal. The mobile terminal may be a foldable mobile phone. It may be understood that the mobile terminal may alternatively be another foldable device, which is not limited in this application. FIG. 5 is a schematic partial structural diagram of a mobile terminal. The mobile terminal includes a foldable mechanism 100 and a flexible screen 200. The foldable mechanism 100 can switch between an unfolded state and a folded state, and the flexible screen 200 is attached to the foldable mechanism 100, so that the flexible screen 200 can be unfolded and folded by using the foldable mechanism 100, thereby switching the mobile terminal between the unfolded state and the folded state.

Figure 6:
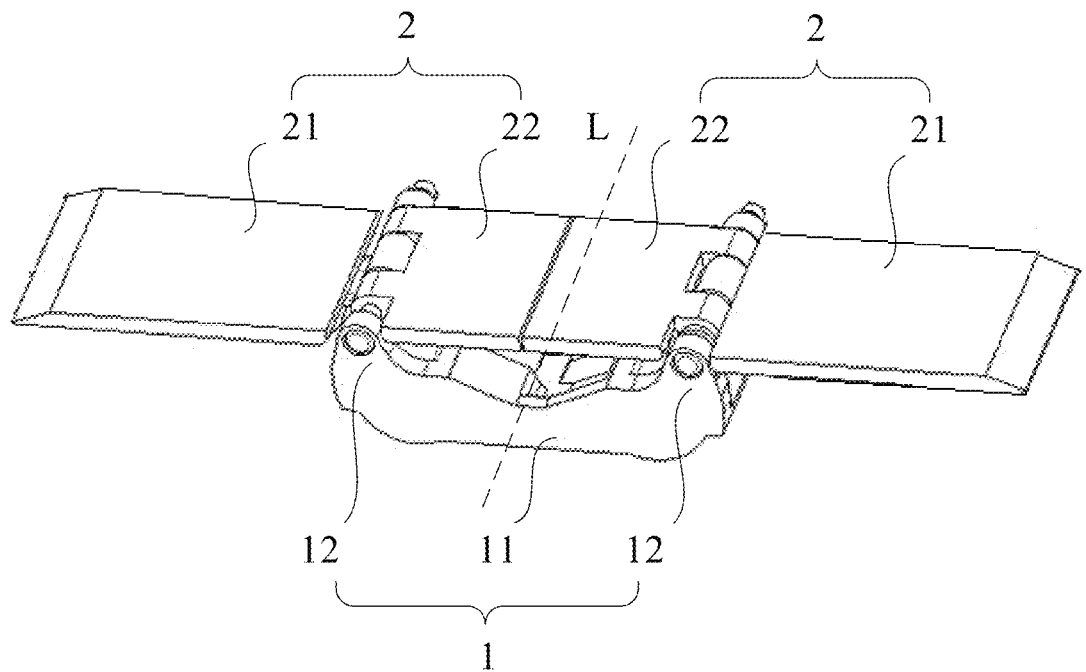
FIG. 6 is a schematic structural diagram of a foldable mechanism according to an embodiment of this application.

The foldable mechanism is a key component for switching the mobile terminal between the unfolded state and the folded state and miniaturizing the mobile terminal. Therefore, the foldable mechanism provided in this embodiment of this application is described below:

FIG. 6 is a schematic structural diagram of the foldable mechanism. With reference to FIG. 6, the foldable mechanism includes a base assembly 1, two support assemblies 2, and driving assemblies 3. It should be noted that the driving assemblies 3 are not shown in FIG. 6 because of being occluded by the support assemblies 2. For the driving assemblies 3, refer to FIG. 7.

The base assembly 1 includes a bottom seat 11 and two hinge seats 12, and the two hinge seats 12 are respectively fixed to two sides of the bottom seat 11. The two support assemblies 2 are respectively located at two sides of a central axis L of the bottom seat 11, the support assembly 2 includes an outer plate member 21 and an inner plate member 22, the two inner plate members 22 are located between the two outer plate members 21, the outer plate member 21 and the inner plate member 22 are pivotally connected to the corresponding hinge seat 12 respectively, and pivotal axes of the outer plate members 21 and the inner plate members 22 are parallel to the central axis L of the bottom seat 11. The two driving assemblies 3 are respectively located at the two sides of the central axis L of the bottom seat 11, and the driving assembly 3 is connected to and between the bottom seat 11 and the inner plate member 22 corresponding to the driving assembly 3.

The foldable mechanism is switched between the unfolded state and the folded state based on flipping of the outer plate member 21 and the inner plate member 22. The outer plate member 21 is manually flipped by a user, and the inner plate member 22 is flipped by the driving assembly 3. The outer plate member 21 and the inner plate member 22 are first described below, and the driving assembly 3 that drives the inner plate member 22 to flip is then described.

Figure 7:
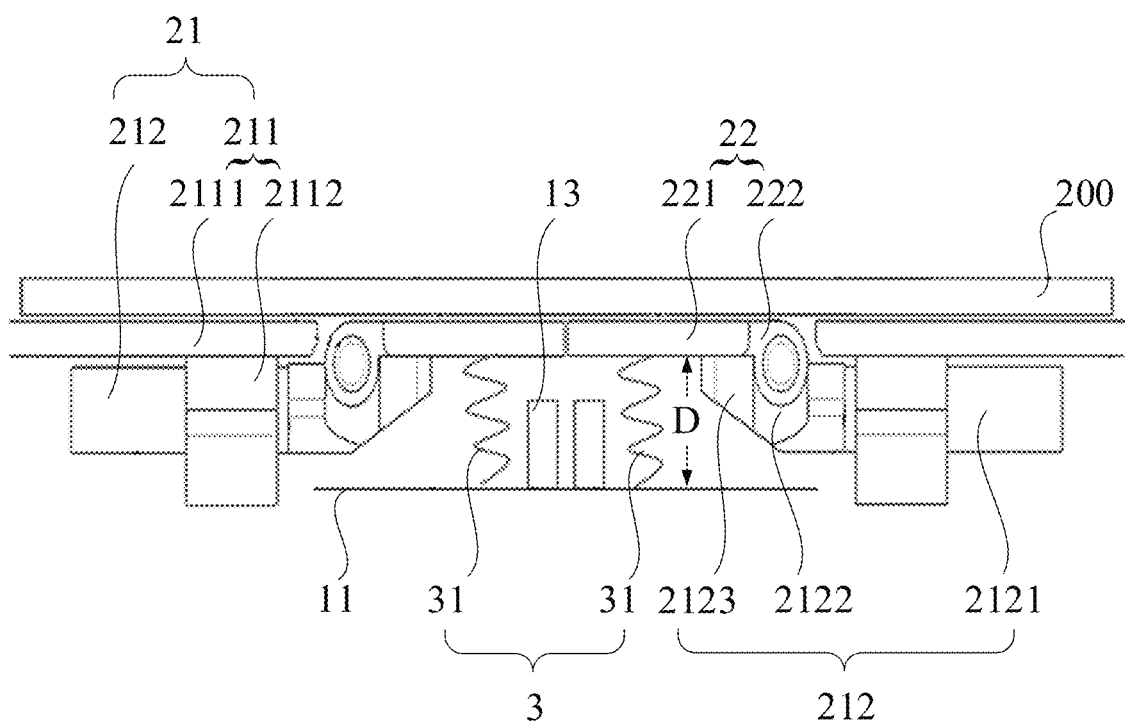
FIG. 7 is a schematic structural diagram of a foldable mechanism according to an embodiment of this application in an unfolded state.
Figure 8:
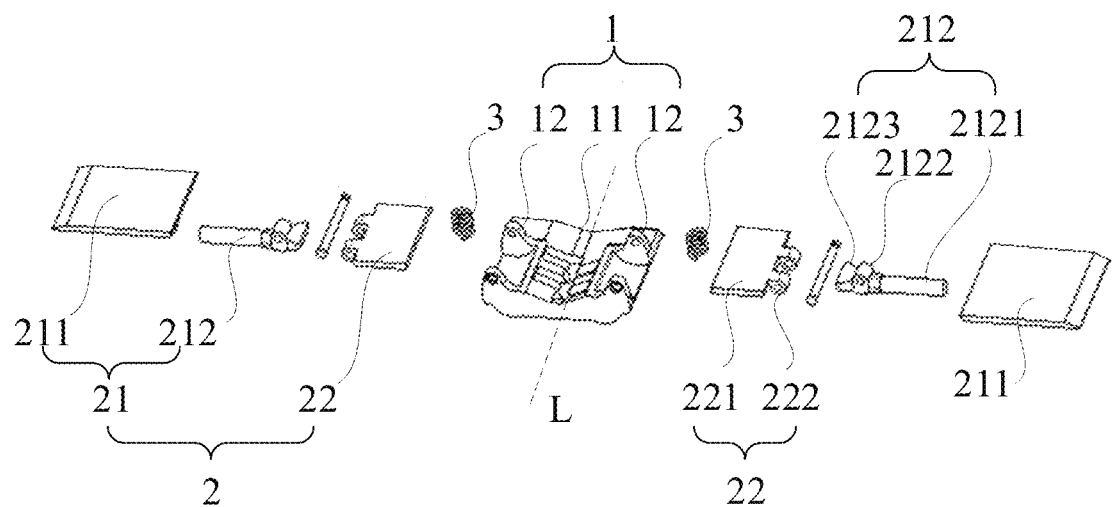
FIG. 8 is an exploded view of a foldable mechanism according to an embodiment of this application.

FIG. 8 is an exploded view of a foldable mechanism. With reference to FIG. 8, in this embodiment, the inner plate member 22 includes an inner support plate 221 and a hinge lug 222. There is a spacing D (referring to FIG. 7) between the inner support plate 221 and the bottom seat 11, the hinge lug 222 is located at a side edge of the inner support plate 221 close to the outer plate member 21 and is connected to the inner support plate 221, and the hinge lug 222 is pivotally connected to the hinge seat 12.

The inner plate member 22 is pivotally connected to the hinge seat 12 by the hinge lug 222, and supports the flexible screen 200 through the inner support plate 221. Moreover, because there is the spacing D between the inner support plate 221 and the bottom seat 11, an enough space is provided for the flipping of the inner support plate 221.

Exemplarily, the hinge lug 222 is pivotally connected to the hinge seat 12 by a pivot. In this way, the pivotal axis of the inner plate member 22 is an axis of the pivot. In addition, to prevent the hinge lug 222 from affecting stable attachment between the inner plate member 22 and the flexible screen 200, the hinge lug 222 is located at one side of the inner support plate 221 facing toward the bottom seat 11. In this way, the hinge lug 222 does not affect the other side of the inner support plate 221.

Optionally, the inner support plate 221 and the hinge lug 222 are an integral structural member, which not only improves the manufacturing efficiency of the inner plate member 22, but also ensures the structural integrity of the inner plate member 22 and improves the structural strength.

Still referring to FIG. 8, in this embodiment, the outer plate member 21 includes an outer support plate 211 and a support arm 212. The support arm 212 is located between the outer support plate 211 and the bottom seat 11, and between the inner plate member 22 and the bottom seat 11, a middle portion of the support arm 212 is pivotally connected to the hinge seat 12, a first end of the support arm 212 is connected to the outer support plate 211, and a second end of the support arm 212 is in contact with a plate surface of the inner plate member 22 facing toward the bottom seat 11.

In the foregoing implementations, there is a spacing between the outer support plate 211 and the bottom seat 11, which provides an enough space for the flipping of the outer support plate 211, thereby preventing the outer support plate 211 from interfering and colliding with the bottom seat 11 during the flipping. One portion of the support arm 212 is located between the outer support plate 211 and the bottom seat 11, to connect the support arm 212 and the outer support plate 211. Another portion of the support arm 212 is located between the inner plate member 22 and the bottom seat 11, so that the support arm 212 lifts the inner plate member 22, thereby stably supporting the flexible screen 200. A part between the two portions of the support arm 212 is pivotally connected to the hinge seat 12, so that support arm 212 rotates around its own pivotal axis.

Exemplarily, the support arm 212 is pivotally connected to the hinge seat 12 by a pivot. In this way, the pivotal axis of the outer plate member 21 is an axis of the pivot. Moreover, for the same support assembly 2, the pivotal axis of the outer plate member 21 and the pivotal axis of the inner plate member 22 are coaxial. That is, the support arm 212 is pivotally connected to the hinge seat 12 by a pivot the same as that by which the hinge lug 222 is pivotally connected to the hinge seat 12. In this way, the outer plate member 21 and the inner plate member 22 can be arranged more compactly, which is more conducive to the miniaturized design.

Figure 9:
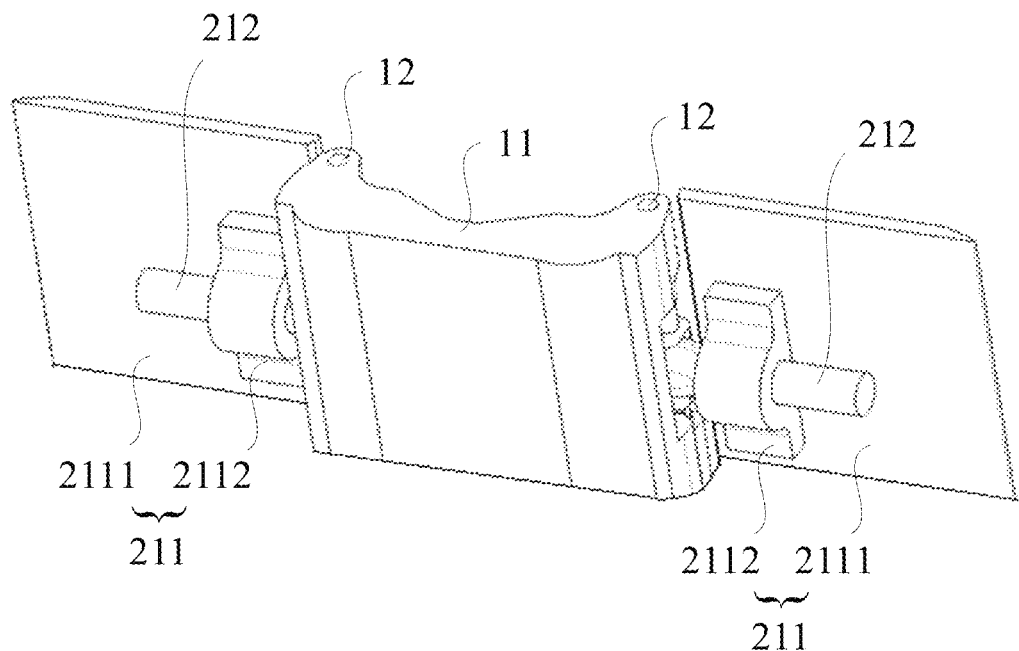
FIG. 9 is a schematic structural diagram of a foldable mechanism according to an embodiment of this application.

FIG. 9 is a schematic structural diagram of a foldable mechanism. A viewing angle of FIG. 9 is opposite to that of FIG. 6. FIG. 9 is a bottom view, while FIG. 6 is a top view.

Referring to FIG. 9, in this embodiment, the outer support plate 211 includes an outer support plate body 2111 and a socket 2112. The socket 2112 is connected to a plate surface of the outer support plate body 2111 close to the bottom seat 11, and the support arm 212 is inserted into the socket 2112.

The socket 2112 provides an insertion basis for the support arm 212, so that the support arm 212 can be inserted on the plate surface of the outer support plate body 2111 facing toward the bottom seat 11. In this way, a joint between the support arm 212 and the outer support plate 211 can be prevented from affecting support of the flexible screen 200 by the outer support plate 211, so that the flexible screen 200 can be stably supported.

Exemplarily, the outer support plate body 2111 and the socket 2112 are an integral structural member, which not only improves the manufacturing efficiency of the outer support plate 211, but also ensures the structural integrity of the outer support plate 211 and improves the structural strength.

Optionally, the socket 2112 includes a flange plate and a cylinder, one plate surface of the flange plate is connected to the outer support plate body 2111, an other, opposite plate surface of the flange plate is connected to an outer wall of the cylinder, and an axis of the cylinder is parallel to the outer support plate body 2111. In this design, the area of a connection between the socket 2112 and the outer support plate body 2111 is increased by using the flange plate, to improve the stability of the connection between the socket 2112 and the outer support plate body 2111.

Exemplarily, the flange plate and the outer support plate body 2111 are connected to each other by screws. Definitely, the flange plate and the outer support plate body 2111 may alternatively be connected by bonding. This is not limited in this application.

Referring to FIG. 8 again, in this embodiment, the support arm 212 includes a first arm body 2121, a hinge cylinder 2122, and a second arm body 2123 that are sequentially connected. The first arm body 2121 is inserted into the socket 2112. The second arm body 2123 is located between the inner plate member 22 and the bottom seat 11, and is in contact with a plate surface of the inner plate member 22 close to the bottom seat 11. The hinge cylinder 2122 is located between the outer support plate body 2111 and the inner plate member 22, and is pivotally connected to the hinge seat 12.

In the foregoing implementations, the first arm body 2121, the hinge cylinder 2122, and the second arm body 2123 are sequentially connected. Therefore, the first arm body 2121 is located at a first end of the support arm 212 in a length direction, the second arm body 2123 is located at a second end of the support arm 212 in the length direction, and the hinge cylinder 2122 is located between the first end and the second end of the support arm 212 in the length direction. The support arm 212 is connected to the outer support plate 211 by the first arm body 2121. The inner plate member 22 is lifted by using the second arm body 2123. The support arm 212 is pivotally connected to the hinge seat 12 by the hinge cylinder 2122.

Exemplarily, the first arm body 2121, the hinge cylinder 2122, and the second arm body 2123 are an integral structural member, which not only improves the manufacturing efficiency of the support arm 212, but also ensures the structural integrity of the support arm 212 and improves the structural strength.

Figure 10:
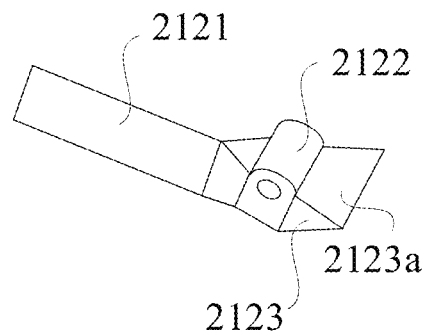
FIG. 10 is a schematic structural diagram of a support arm according to an embodiment of this application.

FIG. 10 is a schematic structural diagram of a support arm. With reference to FIG. 10, optionally, a part of the second arm body 2123 in contact with the inner plate member 22 is a trapezoid surface 2123a, an upper bottom edge of the trapezoid surface 2123a is connected to the hinge cylinder 2122, and the trapezoid surface 2123a is attached to the inner plate member 22. In this design, a contact area between the second arm body 2123 and the inner plate member 22 can be ensured, so that the inner plate member 22 is supported more stably.

Definitely, the part of the second arm body 2123 connected to the inner plate member 22 can alternatively be in another shape, for example, a rectangle or a triangle. This is not limited in this application.

Optionally, the hinge cylinder 2122 partially protrudes from the first arm body 2121 and the second arm body 2123, so that the hinge cylinder 2122 is located at a side of the first arm body 2121 facing toward the outer support plate body 2111 and a side of the second arm body 2123 facing toward the inner plate member 22. In this way, the first arm body 2121 can be conveniently located between the outer support plate body 2111 and the bottom seat 11, and the second arm body 2123 can be conveniently located between the inner plate member 22 and the bottom seat 11, so that the support arm 212 is more compactly arranged in the foldable mechanism.

The outer plate member 21 and the inner plate member 22 are respectively described above, and it is learned that the outer plate member 21 and the inner plate member 22 can flip relative to the bottom seat 11 while always supporting the flexible screen 200 stably. It may be learned from the above that the outer plate member 21 is manually flipped by the user, and the inner plate member 22 is flipped by the driving assembly 3. Therefore, the driving assembly 3 is further described below.

Referring to FIG. 7 again, in this embodiment, the driving assembly 3 includes an elastic member 31, and one portion of the elastic member 31 is connected to the bottom seat 11, and another portion is connected to a part of the inner plate member 22 close to the central axis L of the bottom seat 11.

Figure 11:
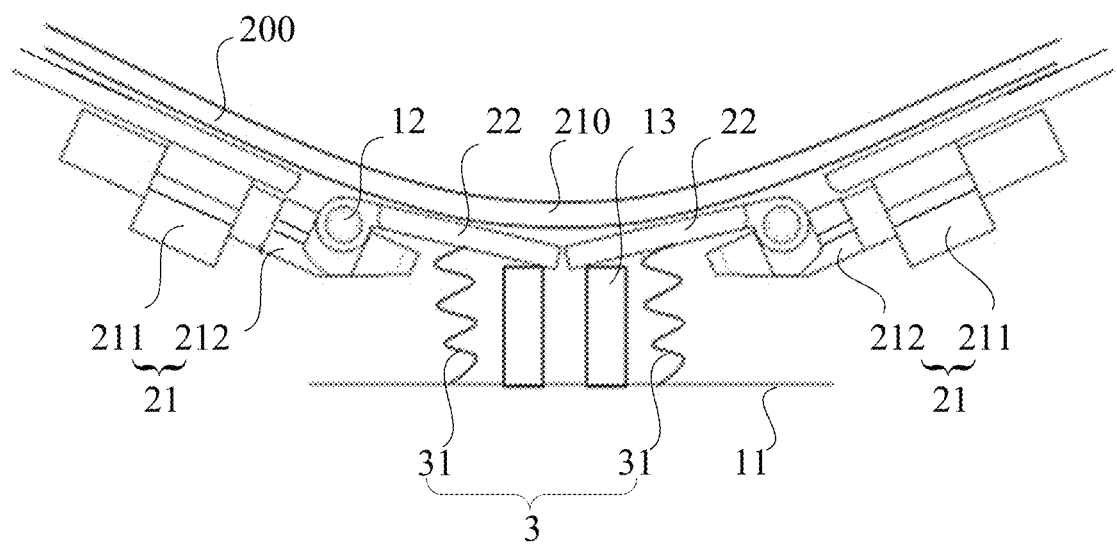
FIG. 11 is a schematic structural diagram of a foldable mechanism according to an embodiment of this application in a folding process.
Figure 12:
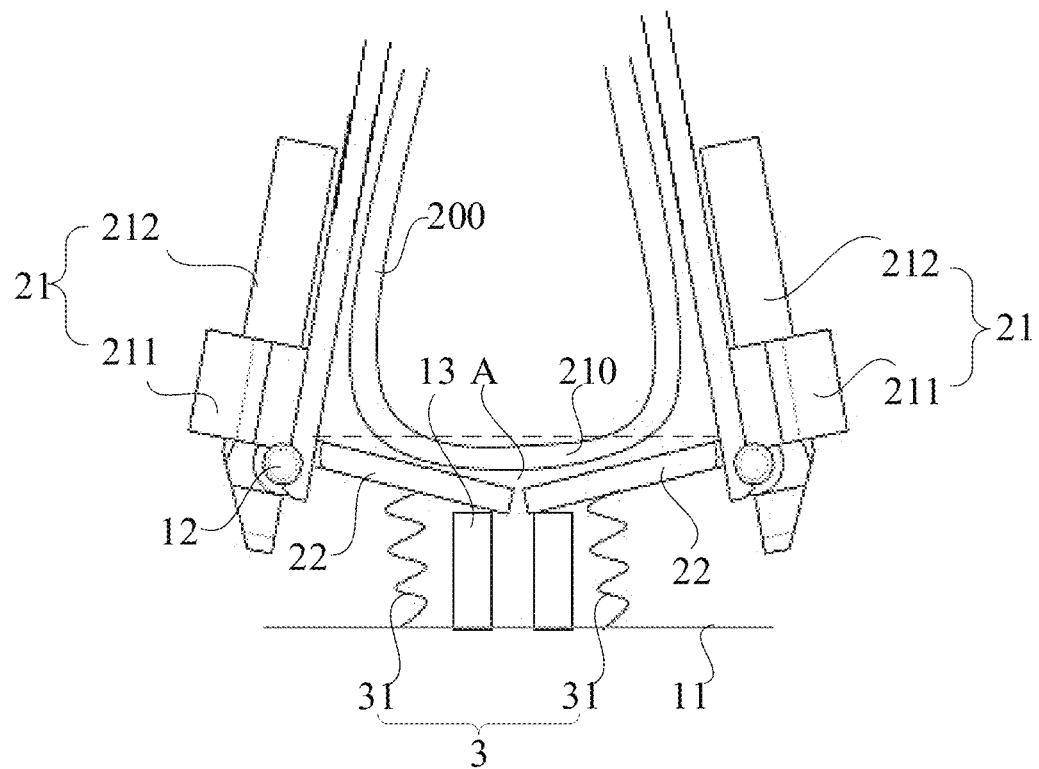
FIG. 12 is a schematic structural diagram of a foldable mechanism according to an embodiment of this application in a folded state.

A work process of the driving assembly 3 is described below with reference to FIG. 7, FIG. 11, and FIG. 12.

When the foldable mechanism is in the unfolded state (referring to FIG. 7), the elastic member 31 is in a stretched state and stores elastic potential energy by itself. Under the action of the elastic member 31, the inner plate member 22 has a tendency to flip toward the bottom seat 11. The middle portion of the support arm 212 is pivotally connected to the hinge seat 12, the first end of the support arm 212 is connected to the outer support plate 211, and the second end of the support arm 212 is in contact with the plate surface of the inner plate member 22 facing toward the bottom seat 11. Therefore, the support arm 212 is equivalent to a lever. Therefore, the gravity of the outer support plate 211 and the flexible screen 200, the friction between the support arm 212 and the hinge seat 12, the deformation resistance of the flexible screen 200, and the like provide a load for the elastic member 31 to pull the inner plate member 22 to flip toward the bottom seat 11. Because the load is much greater than an elastic force of the elastic member 31, the inner plate member 22 can remain stationary under the lifting action of the support arm 212, and is in the same plane as the outer plate member 21, to stably support the flexible screen 200. In this state, the flexible screen 200 can remain flat for a user to operate, view, and so on.

When the foldable mechanism needs to be transformed from the unfolded state to the folded state (referring to FIG. 11), the two outer plate members 21 are flipped facing away from the bottom seat 11 around their own pivotal axes, to release the support arms 212 from lifting the inner plate members 22, and elastic potential energy of the elastic members 31 is released, to pull the corresponding inner plate members 22 to flip toward the bottom seat 11, so that the foldable mechanism is gradually transformed from the unfolded state to the folded state.

After the foldable mechanism is in the folded state (referring to FIG. 12), the elastic members 31 are still in the stretched state, and the two inner plate members 22 remain tilted to each other under the action of the elastic members 31, to ensure continuous existence of a concave space A, thereby stably accommodating a bending part 210 of the flexible screen 200.

That is, the driving assemblies 3 respectively drive the corresponding inner plate members 22 to flip toward the bottom seat 11, to form the concave space A for accommodating the bending part 210 of the flexible screen 200 at an angle between the two inner plate members 22.

Exemplarily, the elastic member 31 is a spiral spring, one end of the spiral spring is connected to the bottom seat 11, and the other end of the spiral spring is connected to the inner plate member 22.

When the flexible screen 200 is borne by the foldable mechanism provided in this embodiment of this application, if the screen needs to be operated or viewed, the foldable mechanism remains in the unfolded state, and in this case, the two inner plate members 22 and the two outer plate members 21 are located in the same plane, to stably support the flexible screen 200 (referring to FIG. 7).

If the flexible screen 200 needs to be folded by folding the foldable mechanism, the two inner plate members 22 flip toward the bottom seat 11 around their own pivotal axes under the action of the driving assemblies 3, to form an angle between the two inner plate members 22 and form the concave space A at the angle. The concave space A can provide a space basis for accommodating the bending part 210 of the flexible screen 200 (referring to FIG. 11). At the same time, the two outer plate members 21 flip facing away from the bottom seat 11 around their own pivotal axes, until the two outer plate members 21 are folded together at sides of the inner plate members 22 facing away from the bottom seat 11 (referring to FIG. 12). In the process of folding the outer plate members 21 together, the flexible screen 200 is gradually folded, and partially forms the bending part 210. Because the concave space A provides the space basis for accommodating the bending part 210 of the flexible screen 200, the bending part 210 of the flexible screen 200 can be accommodated in the concave space A. In this way, the size of the flexible screen 200 located outside the concave space A is reduced, which is conducive to the miniaturized design.

Figure 13:
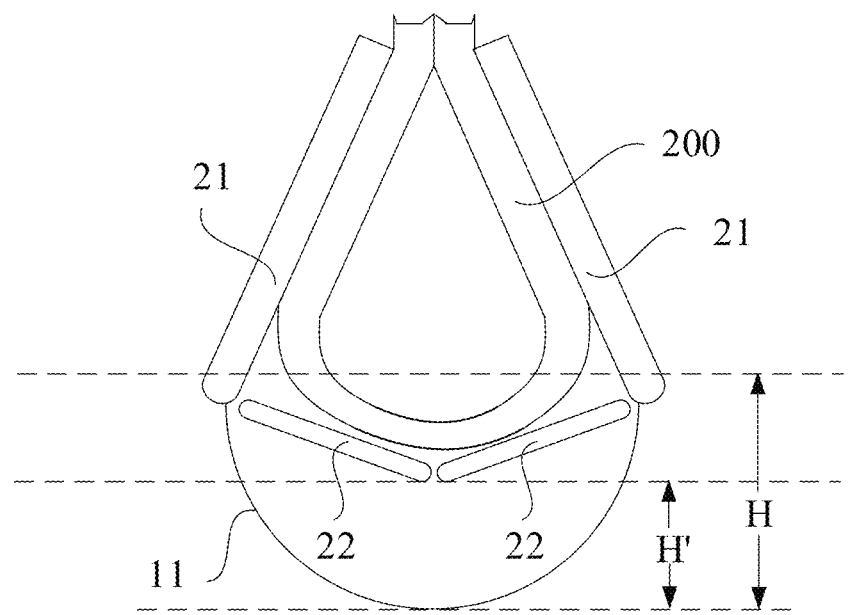
FIG. 13 is a simplified schematic diagram of a foldable mechanism according to an embodiment of this application in a folded state.

FIG. 13 is a simplified schematic diagram of a foldable mechanism in a folded state. It can be learned from FIG. 13 that, after the foldable mechanism is in the folded state, a distance H between the flexible screen 400 and the outer wall of the bottom seat 11 is reduced to H', which can effectively achieve the miniaturized design.

For the driving assembly 3, in addition to the foregoing implementations, this embodiment further provides another implementation of the driving assembly 3.

Figure 14:
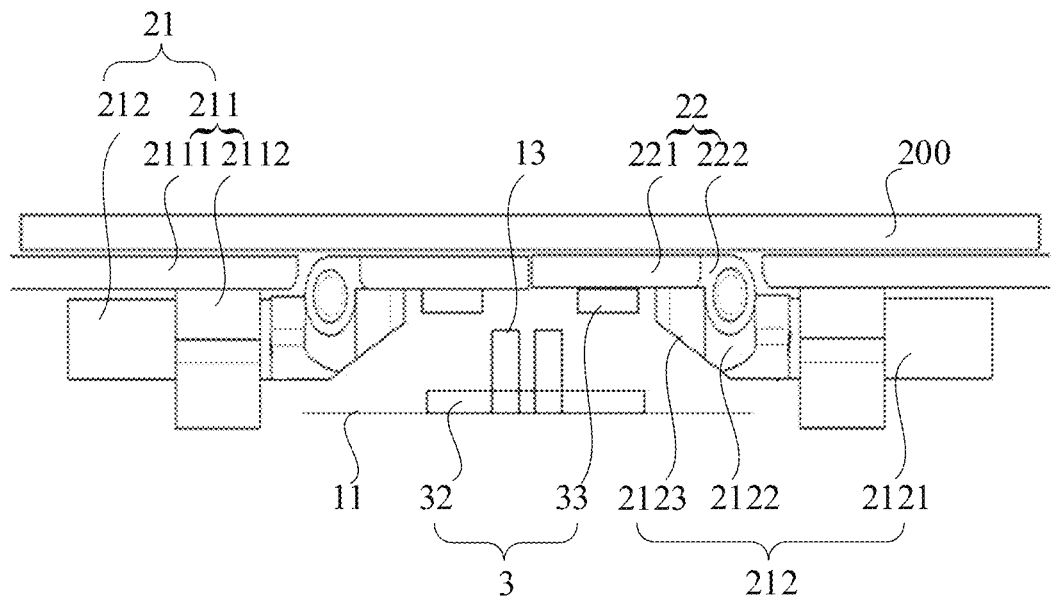
FIG. 14 is a schematic structural diagram of a foldable mechanism according to an embodiment of this application in an unfolded state.

FIG. 14 is a schematic structural diagram of a foldable mechanism in an unfolded state. With reference to FIG. 14, in this embodiment, the driving assembly 3 includes a first magnet 32 and a second magnet 33, and the first magnet 32 and the second magnet 33 are opposite to each other and are close to the central axis L of the bottom seat 11. The first magnet 32 is connected to the bottom seat 11. Second magnets 33 correspond to and are connected to the inner plate members 22 one to one. Portions of the first magnet 32 and the second magnet 33 opposite to each other have different magnetic poles.

Because the portions of the first magnet 32 and the second magnet 33 opposite to each other have different magnetic poles, by using a magnetic attraction force between the first magnet 32 and the second magnet 33, the inner plate member 22 can be pulled to move toward the bottom seat 11, to form the concave space A at the angle between the two inner plate members 22.

When the foldable mechanism is in the unfolded state, the first magnet 32 and the second magnet 33 are attracted to each other, and the inner plate member 22 has a tendency to flip toward the bottom seat 11 under the action of the magnetic force. The inner plate member 22 remains stationary under the lifting action of the support arm 212, and is in the same plane as the outer plate member 21, to stably support the flexible screen 200.

When the foldable mechanism needs to be transformed from the unfolded state to the folded state, the two outer plate members 21 are flipped facing away from the bottom seat 11 around their own pivotal axes, to release the support arms 212 from lifting the inner plate members 22, and first magnet 32 and second magnet 33 are attracted to each other, to pull the corresponding inner plate member 22 to flip toward the bottom seat 11, so that the foldable mechanism is gradually transformed from the unfolded state to the folded state.

After the foldable mechanism is in the folded state, there are still magnetic attraction forces between the first magnets 32 and the second magnets 33, so that the two inner plate members 22 remain tilted to each other, to ensure continuous existence of a concave space A, thereby stably accommodating a bending part 210 of the flexible screen 200.

Exemplarily, both the first magnet 32 and the second magnet 33 are permanent magnets, to ensure that there is always a magnetic attraction force between the first magnet 32 and the second magnet 33.

Exemplarily, the two first magnets 32 are an integral structural member, to better achieve the miniaturized design.

It can be learned from the foregoing description that, to ensure the continuous existence of the concave space A, the driving assemblies 3 always apply acting forces to the inner plate members 22, so that the inner plate members 22 always have a tendency to flip toward the bottom seat 11. To enable the inner plate members 22 to stop at suitable positions, so that the concave space A has a suitable volume, in this embodiment, the base assembly 1 further includes two stop ribs 13. The stop ribs 13 correspond to the inner plate members 22 one to one, the stop rib 13 is located between the bottom seat 11 and the corresponding inner plate member 22, a first end of the stop rib 13 is connected to the bottom seat 11, and a second end of the stop rib 13 extends toward the corresponding inner plate member 22 and is configured to come into contact with the part of the inner plate member 22 close to the central axis L of the bottom seat 11. In this design, a maximum angle by which the inner plate member 22 flips can be limited by using the stop rib 13, thereby limiting the volume of the concave space A, so that the volume of the concave space A can match the flexible screen 200, thereby better achieving the miniaturized design.

Exemplarily, the stop rib 13 is a strip-shaped structural member, and the stop rib 13, the bottom seat 11, and the hinge seat 12 are an integral structural member, which not only improve the manufacturing efficiency of the base assembly 1, but also ensure the structural integrity of the base assembly 1 and improve the structural strength.

Optionally, the second end of the stop rib 13 is a slope, and a plate surface of the inner plate member 22 facing toward the bottom seat 11 is attached to the slope of the stop rib 13 when the inner plate member 22 abuts against the stop rib 13. In this design, a contact area between the stop rib 13 and the inner plate member 22 can be increased, so that the stop rib 13 supports the inner plate member 22 more stably.

It may be learned from the foregoing description that the bending part 210 of the flexible screen 200 is supported by the two inner plate members 22 when the foldable mechanism is in the folded state. Because the two inner plate members 22 are in a tilted state in this case, the two inner plate members 22 support two sides of the bending part 210 of the flexible screen 200 more. To improve the stability of supporting the flexible screen 200 by the foldable mechanism, referring to FIG. 15, which is a schematic structural diagram of a foldable mechanism in an unfolded state, in this embodiment, the inner plate member 22 further includes a tray 223, and the tray 223 is connected to a side edge of the inner support plate 221 close to the central axis L of the bottom seat 11. Two trays 223 are opposite to each other and form an accommodation space B. The foldable mechanism further includes a middle plate member 4 and a middle elastic member 5. The middle plate member 4 is located in the accommodation space B, one plate surface of the middle plate member 4 is in contact with the two trays 223, and an other, opposite plate surface of the middle plate member 4 is configured to come into contact with the bending part 210 of the flexible screen 200. The middle elastic member 5 is connected respectively to and between the middle plate member 4 and the bottom seat 11.

Figure 15:
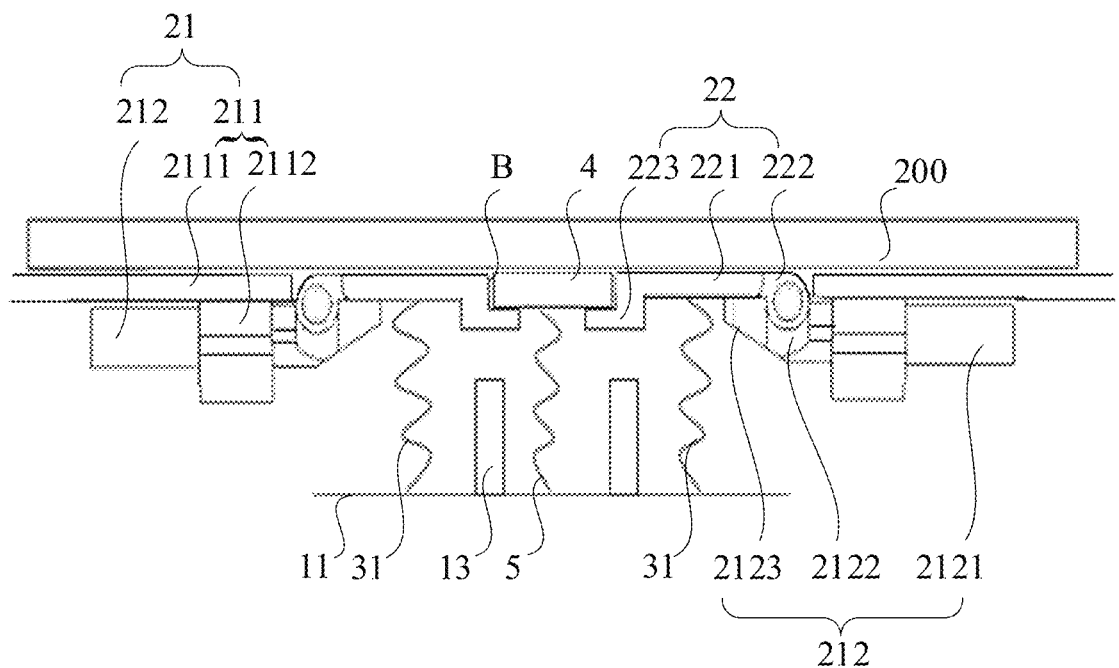
FIG. 15 is a schematic structural diagram of a foldable mechanism according to an embodiment of this application in an unfolded state.

Referring to FIG. 15, when the foldable mechanism is in the unfolded state, the middle plate member 4, the two inner plate members 22, and the two outer plate members 21 are located in the same plane, to support the flexible screen 200. In this state, the flexible screen 200 can remain flat for a user to operate, view, and so on.

Figure 16:
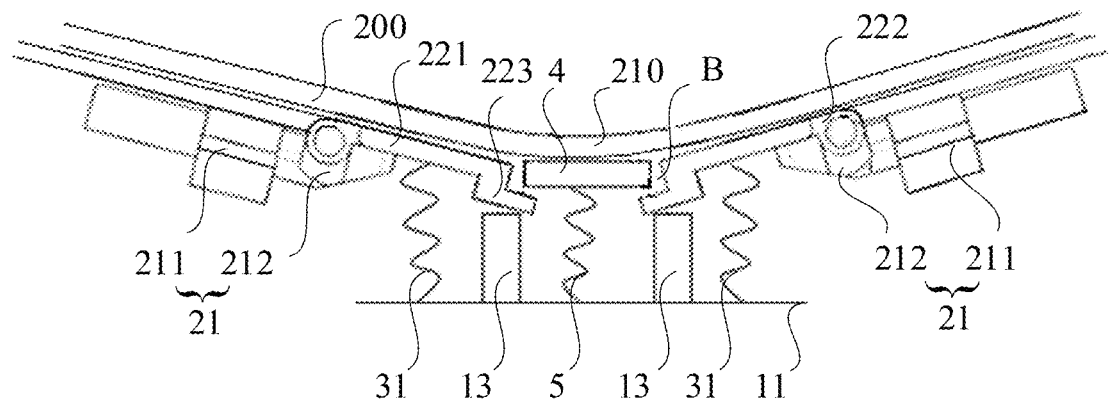
FIG. 16 is a schematic structural diagram of a foldable mechanism according to an embodiment of this application in a folding process.

FIG. 16 is a schematic structural diagram of the foldable mechanism in a folding process. When the foldable mechanism needs to be transformed from the unfolded state to the folded state, the two outer plate members 21 are flipped facing away from the bottom seat 11 around their own pivotal axes, so that the driving assemblies 3 can drive the corresponding inner plate members 22 to flip toward the bottom seat 11. At the same time, the middle elastic member 5 can drive the middle plate member 4 to move toward the bottom seat 11, and the foldable mechanism is gradually transformed from the unfolded state to the folded state.

Figure 17:
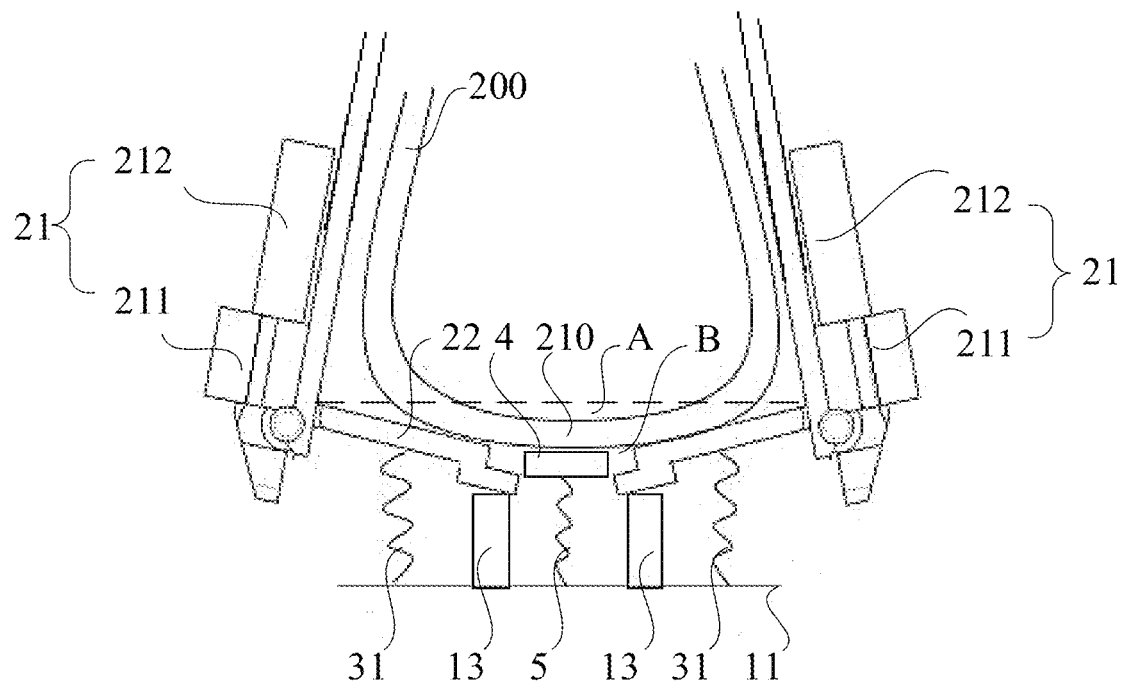
FIG. 17 is a schematic structural diagram of a foldable mechanism according to an embodiment of this application in a folded state.

FIG. 17 is a schematic structural diagram of the foldable mechanism in a folded state. When the foldable mechanism is in the folded state, the driving assemblies 3 respectively drive the corresponding inner plate members 22 to flip toward the bottom seat 11, to form the concave space A for accommodating the bending part 210 of the flexible screen 200 at the angle between the two inner plate members 22. At the same time, the middle elastic member 5 drives the middle plate member 4 to move toward the bottom seat 11, so that the middle plate member 4 is located in the concave space A and is configured to come into contact with the bending part 210 of the flexible screen 200.

It can be seen that the middle plate member 4 can be pulled toward the bottom seat 11 under the action of the middle elastic member 5, so that the middle plate member 4 is located in the concave space A and can come into contact with the bending part 210 of the flexible screen 200. In this way, a contact area between the foldable mechanism and the bending part 210 of the flexible screen 200 is increased, so that the bending part 210 of the flexible screen 200 is supported more stably.

Exemplarily, the middle elastic member 5 is a spiral spring.

In addition, likewise, to ensure that the middle plate member 4 can always be located in the concave space A, the middle elastic member 5 always applies an acting force to the middle plate member 4, so that the middle plate member 4 always has a tendency to move toward the bottom seat 11. Because of the arrangement of the trays 223, the middle plate member 4 can be lifted by the two trays 223 when the middle plate member 4 is located in the accommodation space B, thereby resisting the tendency that the middle plate member 4 moves toward the bottom seat 11. Moreover, as the two inner plate members 22 flip toward the bottom seat 11, the middle plate member 4 also moves toward the bottom seat 11, so that the middle plate member 4 and the two inner plate members 22 can move synchronously, thereby jointly forming the concave space A to accommodate the bending part 210 of the flexible screen 200. Moreover, not only the middle plate member 4 is lifted by the trays 223, but also the middle plate member 4 is accommodated by the accommodation space B, which is conducive to the miniaturized design.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions in this application shall fall within the protection scope of this application.

What is claimed is:

1. A foldable mechanism, comprising a base assembly, two support assemblies, and two driving assemblies, wherein the base assembly comprises a bottom seat, two stop ribs, and two hinge seats, and the two hinge seats are respectively fixed to two sides of the bottom seat;

the two support assemblies are respectively located at two sides of a central axis of the bottom seat, each of the two support assemblies comprises an outer plate member and an inner plate member resulting in two inner plate members that are located between two outer plate members, the two outer plate member and the two inner plate member are pivotally connected to the corresponding hinge seat respectively, and pivotal axes of the two outer plate members and the two inner plate members are parallel to the central axis of the bottom seat;

the two driving assemblies are respectively located at the two sides of the central axis of the bottom seat, and the driving assembly is connected to and between the bottom seat and the inner plate member corresponding to the driving assembly; and in a case that the foldable mechanism is in a folded state, the driving assemblies respectively drive the corresponding inner plate member to flip toward the bottom seat and come into contact with a respective one of the two stop ribs, to form a concave space for accommodating a bending part of a flexible screen at an angle between the two inner plate members.

2. The foldable mechanism according to claim 1, wherein each of the two driving assemblies comprises an elastic member; and one portion of the elastic member is connected to the bottom seat, and another portion is connected to a part of the inner plate member close to the central axis of the bottom seat.

3. The foldable mechanism according to claim 1, wherein each of the two driving assemblies comprises a first magnet and a second magnet, and the first magnet and the second magnet are opposite to each other and are close to the central axis of the bottom seat;

the first magnet is connected to the bottom seat; and the second magnet is connected to the inner plate member, and portions of the first magnet and the second magnet opposite to each other have different magnetic poles.

4. The foldable mechanism according to claim 1, wherein the two stop ribs correspond to the inner plate members one to one, each of the two stop ribs is located between the bottom seat and the corresponding inner plate member, a first end of the respective stop rib is connected to the bottom seat, and a second end of the respective stop rib is configured to come into contact with the part of the inner plate member close to the central axis of the bottom seat.

5. The foldable mechanism according to claim 1, wherein the inner plate member comprises an inner support plate and a hinge lug;
   a spacing is located between the inner support plate and the bottom seat; and
   the hinge lug is connected to a side edge of the inner support plate close to the outer plate member, and the hinge lug is pivotally connected to the hinge seat.

6. The foldable mechanism according to claim 5, wherein the inner plate member further comprises a tray;
   the tray is connected to a side edge of the inner support plate close to the central axis of the bottom seat, and two trays are opposite to each other and form an accommodation space;
   the foldable mechanism further comprises a middle plate member and a middle elastic member;
   the middle plate member is located in the accommodation space, one plate surface of the middle plate member is in contact with the two trays, and another, opposite plate surface of the middle plate member is configured to come into contact with the bending part of the flexible screen; and
   the middle elastic member is connected respectively to and between the middle plate member and the bottom seat.

7. The foldable mechanism according to claim 1, wherein the outer plate member comprises an outer support plate and a support arm; and
   the support arm is located between the outer support plate and the bottom seat, and between the inner plate member and the bottom seat, a middle portion of the support arm is pivotally connected to the hinge seat, a first end of the support arm is connected to the outer support plate, and a second end of the support arm is in contact with a plate surface of the inner plate member facing toward the bottom seat.

8. The foldable mechanism according to claim 7, wherein the outer support plate comprises an outer support plate body and a socket; and
   the socket is connected to a plate surface of the outer support plate body close to the bottom seat, and the support arm is inserted into the socket.

9. The foldable mechanism according to claim 8, wherein the support arm comprises a first arm body, a hinge cylinder, and a second arm body that are sequentially connected;
   the first arm body is inserted into the socket;
   the second arm body is in contact with a plate surface of the inner plate member close to the bottom seat; and
   the hinge cylinder is located between the outer support plate body and the inner plate member, and is pivotally connected to the hinge seat.

10. The foldable mechanism according to claim 9, wherein a part of the second arm body in contact with the inner plate member is a trapezoid surface, an upper bottom edge of the trapezoid surface is connected to the hinge cylinder, and the trapezoid surface is attached to the inner plate member.

11. The foldable mechanism according to claim 1, wherein for the same support assembly, the pivotal axis of the outer plate member and the pivotal axis of the inner plate member are coaxial.

12. A mobile terminal, comprising a foldable mechanism and a flexible screen, wherein
   the foldable mechanism is the foldable mechanism according to claim 1; and
   the flexible screen is attached to the two inner plate members and the two outer plate members respectively.

13. A foldable mechanism, comprising a base assembly, two support assemblies, and two driving assemblies, wherein
   the base assembly comprises a bottom seat and two hinge seats, and the two hinge seats are respectively fixed to two sides of the bottom seat;
   the two support assemblies are respectively located at two sides of a central axis of the bottom seat, each of the two support assemblies comprises an outer plate member and an inner plate member resulting in two inner plate members that are located between two outer plate members, the two outer plate member and the two inner plate member are pivotally connected to the corresponding hinge seat respectively, and pivotal axes of the two outer plate members and the two inner plate members are parallel to the central axis of the bottom seat;
   the two driving assemblies are respectively located at the two sides of the central axis of the bottom seat, and the driving assembly is connected to and between the bottom seat and the inner plate member corresponding to the driving assembly; and
   in a case that the foldable mechanism is in a folded state, the driving assemblies respectively drive the corresponding inner plate member to flip toward the bottom seat, to form a concave space for accommodating a bending part of a flexible screen at an angle between the two inner plate members,
   wherein the inner plate member comprises an inner support plate and a hinge lug, a spacing is located between the inner support plate and the bottom seat, the hinge lug is connected to a side edge of the inner support plate close to the outer plate member, and the hinge lug is pivotally connected to the hinge seat, and
   wherein the inner plate member further comprises a tray, the tray is connected to a side edge of the inner support plate close to the central axis of the bottom seat, and two trays are opposite to each other and form an accommodation space,
   wherein the foldable mechanism further comprises a middle plate member and a middle elastic member, the middle plate member is located in the accommodation space, one plate surface of the middle plate member is in contact with the two trays, and another opposite plate surface of the middle plate member is configured to come into contact with the bending part of the flexible screen, and the middle elastic member is connected to and between the middle plate member and the bottom seat.

14. The foldable mechanism according to claim 13, wherein each of the two driving assemblies comprises an elastic member; and
   one portion of the elastic member is connected to the bottom seat, and another portion is connected to a part of the inner plate member close to the central axis of the bottom seat.

15. The foldable mechanism according to claim 13, wherein each of the two driving assemblies comprises a first magnet and a second magnet, and the first magnet and the second magnet are opposite to each other and are close to the central axis of the bottom seat;

the first magnet is connected to the bottom seat; and
the second magnet is connected to the inner plate member, and portions of the first magnet and the second magnet opposite to each other have different magnetic poles.

16. The foldable mechanism according to claim 13, wherein the base assembly further comprises two stop ribs that correspond to the inner plate members one to one, each of the two stop ribs is located between the bottom seat and the corresponding inner plate member, a first end of the respective stop rib is connected to the bottom seat, and a second end of the respective stop rib is configured to come into contact with the part of the inner plate member close to the central axis of the bottom seat.

17. The foldable mechanism according to claim 13, wherein the outer plate member comprises an outer support plate and a support arm, the support arm is located between the outer support plate and the bottom seat, and between the inner plate member and the bottom seat, a middle portion of the support arm is pivotally connected to the hinge seat, a first end of the support arm is connected to the outer support plate, and a second end of the support arm is in contact with a plate surface of the inner plate member facing toward the bottom seat.

18. A foldable mechanism, comprising a base assembly, two support assemblies, and two driving assemblies, wherein
the base assembly comprises a bottom seat and two hinge seats, and the two hinge seats are respectively fixed to two sides of the bottom seat;
the two support assemblies are respectively located at two sides of a central axis of the bottom seat, each of the two support assemblies comprises an outer plate member and an inner plate member resulting in two inner plate members that are located between two outer plate members, the two outer plate member and the two inner plate member are pivotally connected to the corresponding hinge seat respectively, and pivotal axes of the two outer plate members and the two inner plate members are parallel to the central axis of the bottom seat;
the two driving assemblies are respectively located at the two sides of the central axis of the bottom seat, and the driving assembly is connected to and between the bottom seat and the inner plate member corresponding to the driving assembly; and
in a case that the foldable mechanism is in a folded state, the driving assemblies respectively drive the corresponding inner plate member to flip toward the bottom seat, to form a concave space for accommodating a bending part of a flexible screen at an angle between the two inner plate members,
wherein the outer plate member of each the two support assemblies comprises an outer support plate and a support arm, wherein the support arm is located between the outer support plate and the bottom seat, and a middle portion of the support arm is pivotally connected to the hinge seat between the inner plate member and the bottom seat, a first end of the support arm is connected to the outer support plate, and a second end of the support arm is in contact with a plate surface of the inner plate member facing toward the bottom seat,
wherein the outer support plate comprises an outer support plate body and a socket, and the socket is connected to a plate surface of the outer support plate body close to the bottom seat, and the support arm is inserted into the socket, and
wherein the support arm comprises a first arm body, a hinge cylinder, and a second arm body that are sequentially connected, the first arm body is inserted into the socket, the second arm body is in contact with a plate surface of the inner plate member close to the bottom seat, and the hinge cylinder is located between the outer support plate body and the inner plate member, and is pivotally connected to the hinge seat.

19. The foldable mechanism according to claim 18, wherein each of the two driving assemblies comprises an elastic member; and
one portion of the elastic member is connected to the bottom seat, and another portion is connected to a part of the inner plate member close to the central axis of the bottom seat.

20. The foldable mechanism according to claim 18, wherein each of the two driving assemblies comprises a first magnet and a second magnet, and the first magnet and the second magnet are opposite to each other and are close to the central axis of the bottom seat;
the first magnet is connected to the bottom seat; and
the second magnet is connected to the inner plate member, and portions of the first magnet and the second magnet opposite to each other have different magnetic poles.

* * * * *